L. McCARTHY.
INSULATOR.
APPLICATION FILED FEB. 26, 1909.
1,000,535.
Patented Aug. 15, 1911.
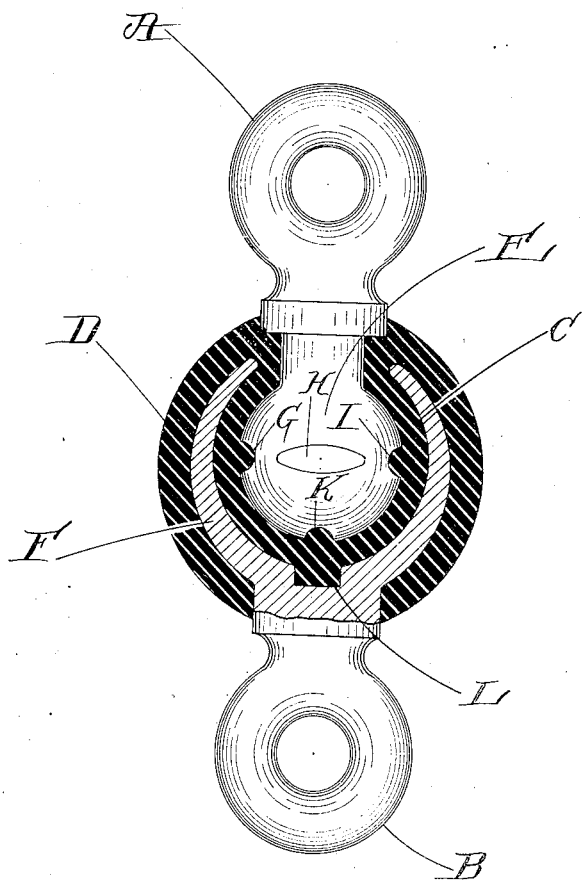

UNITED STATES PATENT OFFICE.

LOUIS McCARTHY, OF BOSTON, MASSACHUSETTS.

INSULATOR.

1,000,535.

Specification of Letters Patent. Patented Aug. 15, 1911.

Application filed February 26, 1909. Serial No. 480,241.

*To all whom it may concern:*

Be it known that I, LOUIS McCARTHY, citizen of the United States, residing at Boston, county of Suffolk, and State of Massachusetts, have invented a certain new and useful Improvement in Insulators, of which the following is a specification, reference being had therein to the accompanying drawings.

My invention relates to insulators of that class in which two metallic members are separated by means of insulation which is plastic under heat, the exterior of said two members being crimped or shaped over the interposed insulation.

The invention relates particularly to strain insulators, the male metallic member of which has a spherical or ball shaped head while the female member is in the form of a hollow sphere, said two members being separated by plastic insulation.

The object of my invention is to afford means which shall render the parts of the insulator more rigid with relation to each other and less likely to become separated or misplaced after they have been assembled.

The members of the insulators embodying my invention are much less likely to turn or revolve with relation to each other and are thus less likely to work loose than are insulators of the form heretofore constructed.

The invention will be fully understood from the following description taken in connection with the accompanying drawings and the novel features are pointed out and clearly defined in the claims at the close of the specification.

The drawing is a section of an insulator embodying my invention.

In the drawing there is shown at A and B the two metallic members which with the interposed insulating material C and the exterior layer of insulation D make up the complete strain insulator. The two members A and B are provided with means of attachment by which connection is made to the span wire, guy wire, or other wire in which the strain insulator is to be placed. In the drawing the member A is shown as the male member and is provided on the end opposite the eye with a head E of globular or ball shape. The other member B, which in the drawing is shown as the female member, is provided on the end proximate the male member A with a cup F which is in the shape of a hollow globe or sphere. Said female member B is originally formed in cup shape and folded or shaped by suitable dies over the globular member E of the male member A and the interposed insulation C.

The head E of the male member A is provided with a series of depressions or grooves. In the drawing I have shown depressions G, H and I, arranged horizontally about the largest diameter of the ball-shaped head E. I have also shown another groove K at the bottom as shown in the drawing. These grooves may be more or less in number and otherwise arranged but I find the arrangement shown in the drawings preferable since the grooves as shown tend to prevent the movement in any direction of the male member A with relation to the female member B. The interior of the female member B may be provided with similar grooves or slots if desired. In practice, I find that a slot L located opposite to the slot K of the male member A is sufficient, since these two slots tend to prevent the rotation of either of the members A or B on their longitudinal axes, such as might result from a twisting strain on the wire in which the insulator is placed.

The plastic insulation C is compressed into the grooves in the two members A and B during the process of manufacture so that the whole is formed into a solid mass and all the parts are held rigidly with respect to each other, since any movement on the part of either member tends to shear off some one of the projections formed by the insulation contained within the grooves.

I am aware that strain insulators are frequently constructed with two male members and a female member but of course it will be seen that my invention is applicable to that form as well as to the form shown in the drawings in which one male and one female member are employed.

What I claim is:

1. The improved insulator comprising a male member having a shank and a substantially spherical head, a female member having a shank and a substantially spherical hollow head, the spherical head of the male member being inclosed within the hollow head of the female member, the hollow head of the female member being formed with an opening through which the shank of the male member projects outwardly, one of said members being formed with a groove in its periphery facing the other member and extending in a plane parallel with the axis of the shanks of the two members, said member being also formed with a plurality of grooves in its periphery extending in a plane at right angles with the axis of the shanks of said two members and insulating material interposed between the heads of said two members and filling said grooves.

2. The improved insulator comprising a male member having a shank and a substantially spherical head, a female member having a shank and a substantially spherical hollow head, the spherical head of the male member being inclosed within the hollow head of the female member, the hollow head of the female member being formed with an opening through which the shank of the male member projects outwardly, the head of said male member being formed with a groove in the end of its head opposite the shank end and being formed with a plurality of grooves spaced at intervals in a circumferential line around its periphery midway between the shank end and the inner end of the head of said member and extending in a plane at right angles with the axis of said shank and insulating material interposed between the heads of said two members and filling said grooves.

3. The improved insulator comprising a male member having a shank and a substantially spherical head, a female member having a shank and a substantially spherical hollow head, the spherical head of the male member being inclosed within the hollow head of the female member, the hollow head of the female member being formed with an opening through which the shank of the male member projects outwardly, the head of said male member being formed with a groove in the end of its head opposite the shank end and being formed with a plurality of grooves spaced at intervals in a circumferential line around its periphery midway between the shank end and the inner end of the head of said member and extending in a plane at right angles with the axis of said shank, said female member being formed with a groove in its inner periphery parallel with the said groove on the inner end of the head of the male member and insulating material interposed between the heads of said two members and filling said grooves.

In testimony whereof I affix my signature, in presence of two witnesses.

LOUIS McCARTHY.

Witnesses:
JENNIE E. SCALLAN,
GEORGE P. DIKE.